Oct. 31, 1967    R. PRIESTLEY    3,349,839
HEAT EXCHANGE APPARATUS
Filed April 19, 1966
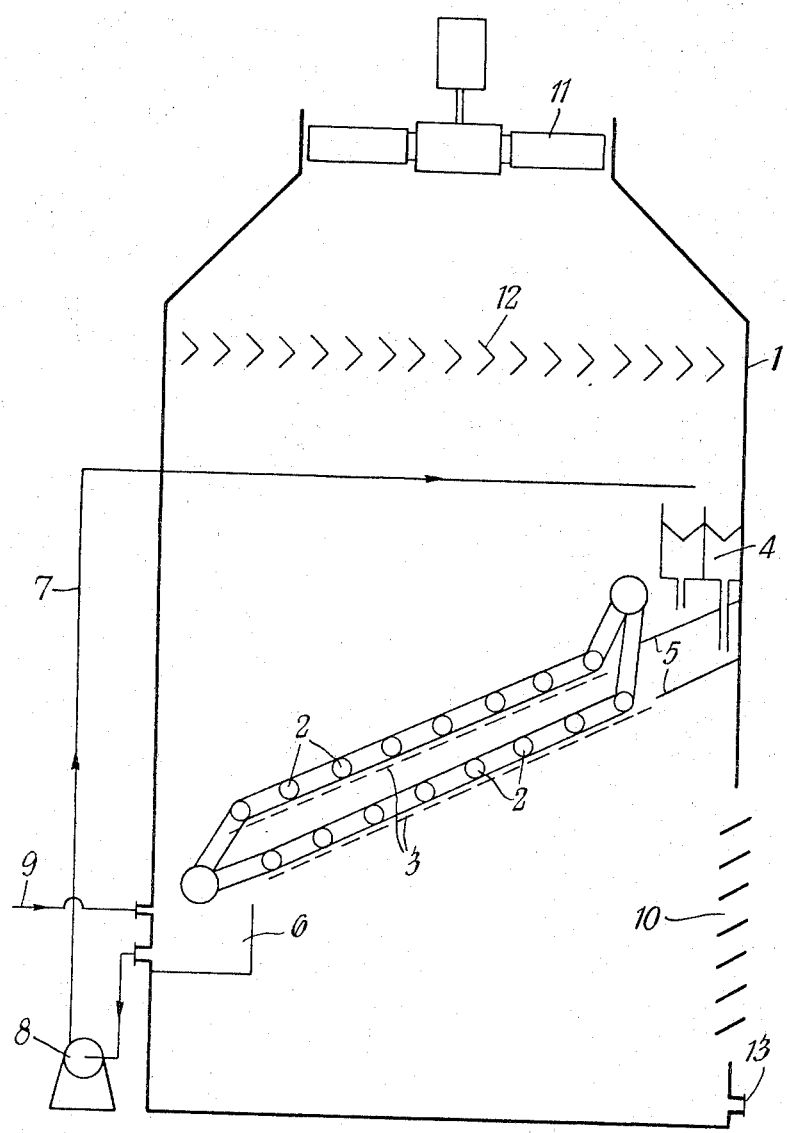

United States Patent Office 3,349,839
Patented Oct. 31, 1967

3,349,839
HEAT EXCHANGE APPARATUS
Ronald Priestley, 14 Salisbury Ave.,
West Kirby, England
Filed Apr. 19, 1966, Ser. No. 543,720
Claims priority, application Great Britain, Apr. 23, 1965,
17,281/65
6 Claims. (Cl. 165—3)

This invention relates to methods and apparatus for heat exchange between a fluid medium contained in and flowing through a tube, and fluid medium located exteriorly of the tube.

A simple and well known method of effecting heat exchange between a fluid medium, e.g. a liquid, contained in and flowing through a tube and a liquid or a mixture of liquid and vapour exterior to the tube consists in causing the latter to flow in contact with the outside of the tube. In practice it is usual to employ a vertical array of tubes through which the heat exchange medium flows, such tubes commonly being disposed horizontally. The exterior liquid flows downwards over each successive tube, is collected at the base of the array and may be recirculated by pumping means. There is usually provided means whereby gases or vapours may be drawn through the said array of tubes.

It is an object of the present invention to provide a new method and apparatus for effecting such heat exchange with greater efficiency.

According to the present invention there is provided an apparatus for heat transference which comprises a plurality of substantially horizontal tubes arranged side by side in a plane inclined to the horizontal, a rigid mesh sheet located immediately adjacent the said tubes and substantially in a plane parallel thereto, means for supplying a heating or cooling fluid to and through the said tubes, means for providing a stream of gas or vapour from below the said mesh sheet to pass through the mesh sheet, means for extracting gas or vapour from above the assembly of tubes and mesh sheet, and means for supplying a liquid to and/or collecting a liquid from said assembly exteriorly of the said tubes.

It is to be understood that since the tube and mesh assemblies are disposed in a plane inclined to the horizontal, the expressions "below" and "above" represent respectively locations within the acute angle and the obtuse angle subtended by the assemblies to the horizontal. Accordingly a stream of gas or vapour from below the assembly may in fact be a horizontal flow through the assembly. For most purposes it is preferred that the mesh sheet should be below the tube assembly.

The basic apparatus just defined may be employed for a wide variety of purposes. Generally it will be employed in processes where a liquid medium exterior of the tubes is supplied to flow down the mesh sheet; in such processes the effect of the mesh sheet is to spread the applied liquid, the flow of gas or vapour then serving to cause the liquid to be sprayed from the mesh sheet onto the tubes (where the heat exchange is effected). The liquid thus conveyed onto the tubes flows down the tubes and is collected suitably at the lowest point of the assembly. Typical of such processes are the following embodiments of the invention:

(a) the apparatus is used as a condenser or evaporative cooler. In this case the fluid to be cooled is caused to flow through the tubes while a coolant liquid is applied to flow down the mesh sheet and be transferred thence onto the tubes.

(b) the apparatus is used as a humidifier or vapouriser. In this case a heating fluid is caused to flow through the tubes while the liquid to be vapourised is applied to flow down the mesh sheet and be transferred thence onto the tubes.

(c) the apparatus is used as a de-humidifier or de-vapouriser. In this case a cooling fluid is caused to flow through the tubes while a suitable de-humidifying or de-vapourising liquid, e.g. aqueous calcium chloride solution is applied to flow down the mesh sheet and be transferred thence onto the tubes.

(d) the apparatus is used as a vapour or gas absorber. In this case a cooling fluid is caused to flow through the tubes and a vapour- or gas-absorbent liquid (which is one having high heat of absorption characteristics) is applied to flow down the mesh sheet and be transferred thence onto the tubes.

In an alternative use of the apparatus defined above the fluid applied exteriorly of the tubes may be a condensable vapour while a cooling fluid is caused to flow through the tubes. In this case the condensable vapour may be applied in admixture with the gas or vapour stream applied from below the mesh sheet. The condensable vapour condenses on the tubes and flows thence down the tubes, or down the mesh sheet, to be collected at a low point of the assembly.

It is found that, in all the various applications of the apparatus important advantages are obtained. In particular, as compared with conventional processes and apparatus, there is effected a substantial increase in heat transfer rate between the two fluids, for given flow rates and operating conditions, thus increasing the efficiency of heat exchange.

Also by this apparatus, a much more complete "wetting" of the tube array is effected, for a given flow rate of exterior liquid, which not only aids heat transfer but eliminates "dry spots" on the tubes. This, in turn, substantially reduces the amount of scale deposited upon the tubes, which results in an increase in tube life and in reduction in maintenance costs.

A further advantage of this apparatus is that for a given "wetting" of the tube array a much smaller flow rate of exterior liquid will suffice, reducing power consumption.

A specific form of apparatus acording to the invention will now be described with reference to the accompanying drawing, which illustrates diagrammatically an embodiment of the apparatus for use as an evaporative condenser.

Referring to the drawing, the apparatus comprises a chamber 1 which has within it an array of interconnected inclined horizontal tubes 2 optionally provided with radial fins. Below each row of tubes 2 is located a mesh sheet 3. This is conveniently a metal or plastic sheet, e.g. a sheet of so-called "expanded" metal, or an analogously constructed sheet made of synthetic plastic. Preferably the orientation of the mesh sheet should be such that the surfaces of the strands tend to the horizontal with the longer axes of the apertures substantially parallel to the axes of the tubes. At the upper end of the array of tubes 2 are provided liquid distribution troughs 4 whence liquid may fall onto plates 5, e.g. of metal or plastic, which are so disposed that liquid flowing off them will fall on the respective mesh sheets 3. At the lower end of the array of tubes 2 and mesh sheets 3 is disposed a liquid collecting vessel 6. A pipe line 7 and pump 8 connect this vessel to the distribution troughs 4. A further pipe line 9 is provided for supply of liquid to the vessel 6.

In a wall of the chamber 1 below thearray 2 and mesh sheets 3 is provided an inlet for air 10 and at the upper end of the chamber 1 is provided an exhaust fan 11. Situated across the chamber, above the array 2 and mesh sheets 3 is a mist collection device 12. A drain 13 is provided at the base of the chamber 1.

The method of operation of the apparatus just described, as an evaporative condenser, is as follows:

The vapour to be condensed enters the array of inclined horizontal tubes at the upper end and condensate leaves the tubes at the lower end. The cooling is effected by the evaporation of water which flows from the distribution troughs 4 over feed plates 5 which overlap the edge of the mesh sheets 3 to run down these sheets. From these however, the water is lifted by the action of the fan 8, which draws air into the chamber 1 through the inlet 10 and through the mesh sheets 3. The water thus driven off the mesh impinges on the surfaces of the tubes and its subsequent evaporation therefrom cools the vapour in the tubes. Spray carryover from the chamber is reduced by the provision of the mist eliminators 12. The water pours slowly down the inclined row of tubes and finally collects in vessel 6, whence it is recirculated to the distribution troughs 4 by pump 8. Additional water is added to vessel 6 via pipe 9 to replace water losses due to spray loss, evaporation loss and drainage loss. For the removal of this last, a drain 13 is provided at the base of the chamber.

Illustrative of the use of apparatus according to the invention are the following particulars, referred to the apparatus of the drawings.

TUBES

| | |
|---|---|
| Dimensions of tubes | Root diameter ⅝"; Outside diameter of fins ¾"; 19 fins per inch. |
| Tube pitch | 1¼ ins. |
| No. Tube rows | 2. |
| Material | Admiralty brass. |

MESH SHEET

| | |
|---|---|
| Expanded metal | 1/16 in. strand width; ⅛ in. wide aperture. |
| Inclination of tube rows (and expanded metal) | 30° to horizontal. |
| Water velocity inside tubes | 4 ft./sec. |
| Water flow outside tubes | 2600 lb./hr. per ft. length of tubes per row. |
| Air velocity at face | 7½ ft./sec. |

With an average hot water temperature inside the tubes of 115° F., and an air supply at a wet bulb temperature of 65° F., the overall heat transfer coefficient based upon the root area of the tubes and effective temperature difference between the wet bulb temperature of the air and the water temperature inside the tubes exceeded 200 B.t.u./hr. ft.$^2$ ° F.

I claim as my invention:

1. A heat exchange process which comprises passing a fluid at one temperature through a plurality of substantially horizontal tubes arranged side by side in a plane inclined to the horizontal, supplying a liquid at another temperature, to a rigid mesh sheet located immediately below and adjacent thereto and substantially in a plane parallel thereto, transferring said liquid from the mesh sheet to the outside of said tubes by passing a stream of gas or vapour, from below, through the assembly of mesh sheets and tubes, and collecting fluid issuing from the exterior of said tubes.

2. A heat exchange process according to claim 1 wherein a fluid to be cooled is caused to flow through the tubes while a coolant liquid is caused to flow down the mesh sheet and be transferred thence onto the tubes.

3. A heat exchange process according to claim 1 wherein a heating fluid is caused to flow through the tubes and a liquid to be vapourised is applied to flow down the mesh sheet and be transferred onto the tubes.

4. A heat exchange process according to claim 1 wherein a cooling liquid is caused to flow through the tubes while a dehumidifying liquid is applied to flow down the mesh sheet and be transferred onto the tubes.

5. A heat exchange process according to claim 1 wherein a cooling liquid is caused to flow through the tubes and a condensible vapour is applied to the tubes from below the mesh sheet.

6. A process according to claim 5 wherein the condensible vapour is applied in admixture with the gas or vapour stream applied from below the mesh sheet.

References Cited

UNITED STATES PATENTS

| | | | |
|---|---|---|---|
| 1,631,141 | 6/1927 | Lorenz | 62—304 |
| 1,895,954 | 1/1933 | Wilde | 261—153 |
| 2,209,999 | 8/1940 | Patch | 62—314 |
| 2,556,250 | 6/1951 | Bauman | 62—94 X |
| 2,805,559 | 9/1957 | Hamilton | 261—163 X |
| 3,146,609 | 9/1964 | Engalitcheff | 165—117 X |

FOREIGN PATENTS

| | | |
|---|---|---|
| 937,830 | 9/1963 | Great Britain. |

ROBERT A. O'LEARY, *Primary Examiner.*

A. W. DAVIS, JR., *Assistant Examiner.*